J. STANDER.
RESILIENT TIRE AND FILLING THEREFOR.
APPLICATION FILED MAY 12, 1919.
1,343,233.
Patented June 15, 1920.
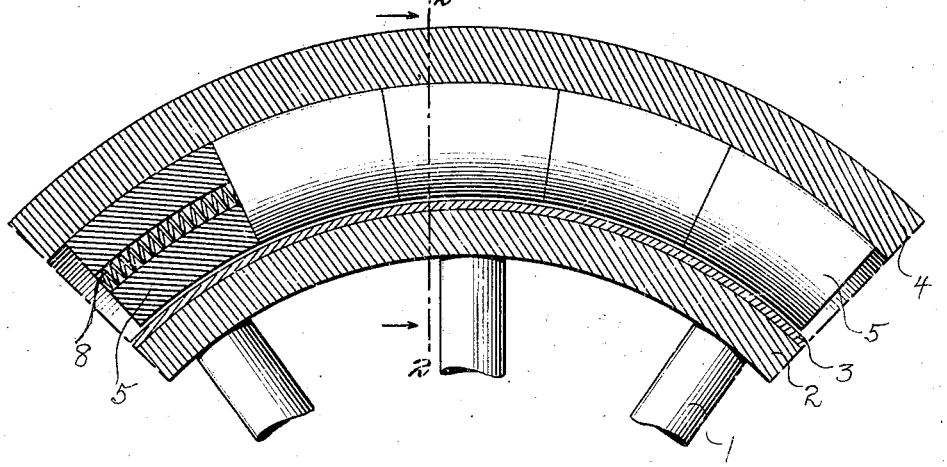
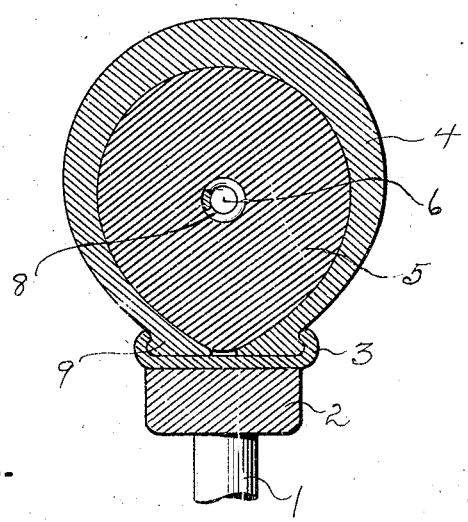
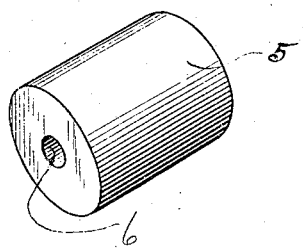
INVENTOR
Jacob Stander
BY
Mocket Blum
ATTORNEYS

UNITED STATES PATENT OFFICE.

JACOB STANDER, OF BROOKLYN, NEW YORK.

RESILIENT TIRE AND FILLING THEREFOR.

1,343,233.  Specification of Letters Patent.  Patented June 15, 1920.

Application filed May 12, 1919. Serial No. 296,287.

*To all whom it may concern:*

Be it known that I, JACOB STANDER, a citizen of the United States, residing at Brooklyn, in the county of Kings and State of New York, have invented certain new and useful Improvements in Resilient Tires and Filling Therefor, of which the following is a specification.

My invention relates to a new and improved resilient tire and a filling therefor.

Pneumatic tires, as is well known, consist of an outer shoe or cover made of considerable strength and stiffness, which incloses and protects an inner tube made of rubber, which is inflated with air at a suitable pressure, sufficient to take up the weight of the vehicle.

Pneumatic tires are subject to many defects, such as blow-outs and the like, and numerous tires have been proposed to obviate the need of the inner air tube.

Such attempts have hitherto not met with real success because the tires so produced have not been sufficiently resilient or elastic to enable them to be used for vehicles which are intended to go at the ordinary speeds of a pleasure automobile and they did not take up the shocks with the same efficiency as pneumatic tires. Whenever metal parts were incorporated into these tires, they speedily gave way because the rapid succession of shocks, to which they were subjected in the ordinary use on the wheel of an automobile produced what is known as fatigue of metal, so that these metal parts deteriorated and rapidly broke or became useless.

According to my invention, an improved tire is produced which has all the resiliency and elasticity of the ordinary pneumatic tire and has none of the defects thereof, save that, of course, the cover or shoe is bound to wear out in time.

Other objects of my invention will be shown in the following description and drawings which illustrate a preferred embodiment thereof.

Figure 1 is a vertical elevation of a wheel to which my improved tire has been applied, and is partially in section.

Fig. 2 is a section along the line 2—2 of Fig. 1, in the direction of the arrows.

Fig. 3 is a perspective view of one of the filler sections.

Fig. 4 is an elevation of one of the springs inserted in each filler section.

The wheel of the automobile has the ordinary spokes 1, felly 2 provided with the usual rim 3 for the beads 9 of the shoe or cover 4, which is of the ordinary well-known type, and requires no further description. Any means of securing the cover to the felly may be provided and used as my invention is neither directed nor limited to these points.

Instead of having the ordinary inner tube, the shoe is filled with a series of perforated sections 5 having coil springs 8 located in their perforations 6. These sections 5 are preferably cylindrical and made of pure vulcanized rubber which is extremely resilient. The springs 8 have their coils made so stiff that they are substantially non-yieldable in a direction at right angles to the axis of each coil 8, which substantially coincides with the axis of the filler section 5 in which the coil spring 8 is located. Of course, the yielding of the coils of spring 8 depends upon the weight of the automobile and the load it carries and these coils 8 are designed with respect to the loads they are intended to carry. The coils 8 may fit tightly in perforation 6.

To fill the shoe 4, the beads 9 are forced apart and the filler sections 5 each having a coil spring 8 in its bore 6 are thrust one by one into the shoe 4, until when the last one is squeezed in with considerable force, the entire shoe is filled with the sections 5 as shown in Fig. 1. While there are preferably no connections or securing means between the various sections 5, there is considerable frictional hold between their adjacent faces so that various sections resist any attempt to move any one of them out of line.

The coil springs 8 prevent the sections 5 from collapsing so as to close the bores 6 when the load is applied, so that a continuous inner vein of air always exists in the communicating bores 6 of the sections 5, which materially assists in preventing the tire from becoming overheated.

The operation of this tire is as follows:—

As the cylindrical sections 5 are forced into place, they assume an arcuate form, the portions adjacent the felly of the wheel becoming compressed and the portions adjacent the periphery of the tire becoming extended since the sections can resist shearing stresses. While it would be possible to so cut the filler sections 5 so as to naturally give them this contour and enable them to be assembled without any distortion, it is preferable to cut them in the shape shown in Fig. 3 so that they do become distorted when forced into the cover 4 and assume the configurations shown in Fig. 1. Since the longitudinal elements of the sections 5 are straight lines, they are of zero curvature and hence their curvature is less than that of the circumferential elements of the shoe.

As a result of this distortion, the adjacent faces of the sections 6 are forced into contact with each other in the region between the bores 6 and the felly, the pressure between the adjacent faces being greatest on the line nearest the felly.

The coil springs 8 also are bent into an arcuate form as is clearly shown in Fig. 1 and they also have the tendency to assume the normal straight line configuration shown in Fig. 4.

When therefore the load is taken up by the peripheral part of the sectional sections which are lowermost in the wheel, the first effect of the load is to straighten out the outer half or halves of the sections which are in a condition of tension and are not pressed against each other with any great force, so that there is room for free movement and distortion.

As the wheel revolves and each section moves from the lowermost position to a position away from the point of contact with the ground, the coil springs 8 cause it to move back to the position shown in Fig. 1 which is supposed to portray the upper half of the tire that is absolutely free from the load.

In this manner, as the wheel rotates, there is no relative movement of the section with respect to the shoe and hence no internal heat is generated.

If the tire encounters a small stone or the like, when the wheel is rotating quite rapidly, the shock is largely taken up by a relative distortion of the peripheral part of the adjacent filler section, which is under tension as before explained, so that the shock is naturally taken up by the resiliency and relative inner movements and distortions of the tire itself, exactly as in a pneumatic tire, and without communicating the full shock to the driving mechanism and passengers in the vehicle.

The coil springs 8 prevent the sections 5 from collapsing, which is highly desirable for producing the free relative distortions of the various sections 5 as before described.

If desired, other ways for securing the sections 5 to the felly of a wheel can be used as my invention is not limited to the specific device of a shoe or cover and generally speaking, while I have shown a preferred embodiment of my invention, I do not wish to be limited to its details.

Thorough tests have shown that on light passenger cars the above described tire is as resilient and easy running as an ordinary pneumatic tire and the car can be run at high speed without generating any more heat in the tire than in a pneumatic, while the tire is, of course, absolutely free from punctures, blow-outs, and the like, and the filler can be used for a very long time.

It is preferred to wedge the sections 5 into the shoe 4 so tightly, with reference to the normal load which the automobile is expected to bear, that the flattening of the filler section which bears the load is substantially taken up by the stretched or elongated part of the said filler section. It can be readily seen that the sections 5 themselves could bear directly upon the ground by being suitably secured to the felly of the wheel thus avoiding all need of the shoe 4.

The coils of the springs 8 are of such pitch, that when under normal load, the pressure of the resilient sections 5 is not sufficient to fill up the spaces between the coils.

What I claim is:—

1. In a resilient tire, the combination of a casing and a plurality of filling members tightly wedged into the said casing so that each filling member assumes the contour of the said casing, each filling member being made of rubber and being vulcanized into a shape having a longitudinal curvature which is smaller than the circumferential curvature of the said casing so that the peripheral portion of each member is tensed and its felly portion is compressed when it is wedged into said casing, the said filling members having bores therein and having their adjacent faces tightly compressed against each other, each said bore having a metal member located therein which can be easily distorted so that each said filling member can readily assume a shape similar to the circumference of the said casing, the said metal members being substantially incompressible in the radial direction.

2. In a resilient tire, a plurality of resilient sections embodying soft resilient material and means for maintaining the said sections tightly pressed against each other, the peripheral portions of the said material being maintained elongated so as to be under a tension, and the felly portions being maintained compressed so as to be under pressure, the said sections having bores which communicate with each other, the said bores having springs located therein, the said material being capable of resisting shearing stresses and the said springs being free from tension.

3. In a resilient tire, a plurality of resilient sections embodying soft resilient material and means for maintaining the said sections tightly pressed against each other, the peripheral portions of the said material being maintained elongated so as to be under a tension, and the felly portions being maintained compressed so as to be under pressure, the said sections having bores which communicate with each other, the said bores having springs located therein, the said springs having a series of coils which are substantially rigid in a direction at right angles to the axes of the said bores, the said material being capable of resisting shearing stresses.

4. In combination, a cover adapted to be held to the felly of a wheel, and a resilient filling for the said cover, said filling comprising a series of bored sections of normal cylindircal shape and made of soft resilient material, said sections having their adjacent faces tightly in contact with each other and having their peripheral parts conforming to the shape of the said cover so as to be elongated and subjected to tension, the said sections having their inner parts in conformity with the said cover so as to be compressed, and coil springs located in the bores of the said sections which communicate with each other throughout the said tire, the said coil springs being substantially incompressible in a direction at right angles to the axes of the said bores, the said material being capable of resisting shearing stresses.

In testimony whereof I hereunto affix my signature.

JACOB STANDER.